United States Patent [19]

La Rocca

[11] 3,709,597

[45] Jan. 9, 1973

[54] CAMERA ACCESSORY FOR PHOTOGRAPHING PRINT

[75] Inventor: Salvatore La Rocca, Framingham, Mass.

[73] Assignee: Polaroid Corporation, Cambridge, Mass.

[22] Filed: April 26, 1971

[21] Appl. No.: 137,151

[52] U.S. Cl. .................... 355/61, 95/44 R, 355/75
[51] Int. Cl. ............................................ G03b 27/62
[58] Field of Search ............. 95/18, 44 R; 355/75, 61

[56] References Cited

UNITED STATES PATENTS

| | | | |
|---|---|---|---|
| 3,388,646 | 6/1968 | Sullival | 95/44 X |
| 3,424,070 | 1/1969 | Nyman | 95/44 X |
| 3,330,193 | 7/1967 | Kaess | 95/44 X |

*Primary Examiner*—Samuel S. Matthews
*Assistant Examiner*—Michael L. Gellner
*Attorney*—Brown & Mikulka, William D. Roberson and Robert L. Berger

[57] ABSTRACT

An accessory device for releasable attachment to the camera unit of an established identification system to permit the use of a photograph of a person instead of the actual person as the photographic subject for reproduction on an identification card. The device basically comprises lens means supplementary to the camera lens; target means cooperating with an aiming light of the camera, and structure associated with an elongated support member for positioning the photograph in front of the camera. The device is adapted to rapid installation or removal so that either the aforementioned photograph or an actual person in the conventional system may constitute the photographic subject, the changeover involving but a few seconds.

29 Claims, 6 Drawing Figures

INVENTOR.
SALVATORE LAROCCA

BY

Brown and Mikulka
ATTORNEYS

PATENTED JAN 9 1973 3,709,597

INVENTOR.
SALVATORE LAROCCA

BY

Brown and Mikulka
ATTORNEYS

CAMERA ACCESSORY FOR PHOTOGRAPHING PRINT

BACKGROUND OF THE INVENTION

1. Field of the Invention

The present invention relates to a widely-adopted identification system known as the "ID-2 Land Identification System," and sold by Polaroid Corporation, Cambridge, Mass., U.S.A. This system utilizes a tiltable camera unit which includes such features as an electronic flash element, an aiming light, means for supplying data to be carried by an identification card, and means for supplying and rapidly processing color film known as "Polacolor Land Film Type 108," also sold by Polaroid Corporation. While the subject invention is particularly pointed to use with the aforesaid camera, it may be employed, with minor modification, with camera means of another identification system.

2. Description of the Prior Art

Photographic identification systems, in general, involve the posing of an animate subject in front of a camera unit. Production of a photographic print and its transfer by one method or another to an identification card bearing data and, usually, the signature of the subject are generally characteristic of such systems. The above-referenced system has been described in detail in the literature which is widely available. It is predominantly an automatic system in that no focusing, substantially no operational judgment, and no manual contact with the film are required to produce a finished print containing the subject's picture in full color and accompanying data and signature, in approximately 1 minute. Means of this system, additional to the camera unit, include laminating, die-cutting and sealing equipment for enhancing the appearance and stability of the finished identification card. The subject invention bears no special relation to these additional means.

BRIEF SUMMARY OF THE INVENTION

The present invention is directed to a modification of previous identification systems and, more particularly, to a modification of the above-described Polaroid Corporation "ID-2 Land Identification System" which permits the use of a photographic print of the person to be identified as the photographic subject where an advantage exists in so doing. Many companies, government agencies, or the like may comprise branch facilities scattered over large geographical areas. It may well be impractical to install a complete identification system of the character described at each of these facilities. On the other hand, the time consumed or the expense involved may argue against the transport of personnel to that location at which an identification system is installed. By making it possible to utilize a relatively inexpensive photographic print, e.g., one in full color, as the photographic subject, and arranging its forwarding, together with the pertinent data and signature, to the address at which the identification system equipment is located, the aforementioned disadvantages may be avoided.

Basically, the apparatus of the subject invention required to modify the camera unit of an identification system comprises an aiming light associated with the camera (if one is not supplied therewith), a supplemental lens for reducing the subject-to-film plane distance, means for positioning a photographic print in front of the camera, and a target means associated with the print-positioning means and cooperating with the aiming light.

More particularly, with reference to modification of the Polaroid Corporation "ID-2 Land Identification System," with which the device of the subject invention is especially intended to be combined, the supplemental lens element is in the form of two vertically-spaced lenses carried by a detachable mounting unit for producing, in conjunction with two similarly separated lenses of the camera, two identification cards from each film component of a film pack, one of which cards is to be kept on the person of the subject and the other, for example, to be retained at a records central. The component for positioning the photographic subject print in front of the camera includes such features as that for providing a releasable attachment to the camera base or cradle; an adjustable frame for mounting the print, and an angularly-extending arm bearing two vertically displaced targets which individually intercept a beam from the aiming light of the camera, as provided by tilting of the latter to raise or lower the beam. When the beam is aligned with the upper target, the upper lens of the vertically-spaced lenses of the camera and the upper lens of the supplemental lens element optically aligned therewith operate together to focus an image of the subject photographic print on a given correct area of the film component positioned at the focal plane of the camera, e.g., an area lying within the upper half of the film component. When the beam is lowered so as to be aligned with the lower target, the lower lenses of the camera and supplemental lens element cooperate to focus an image of the subject print on an area within the other half of the film component. It will be understood that the targets are predeterminately positioned with respect to the subject print to insure the foregoing.

In accordance with the above considerations, a principal object of the invention is to provide an accessory device for releasable attachment to the camera unit of an identification system to permit the use of a photograph of a person instead of the actual person as the photographic subject.

Other objects are to provide a device of the character described which is of relatively simple construction and readily installed or removed; to provide a device, as stated, which is especially adapted to combination with the aforementioned "ID-2 Land Identification System," manufactured by Polaroid Corporation; to provide a device of the type set forth which basically comprises supplemental lens means for providing a given reduction of the subject-to-film plane distance characteristic of the lens means of the camera unit of an identification system, means for positioning a photograph serving as the photographic subject of the system in front of the camera unit, and target means cooperating with an aiming light of the camera for intercepting a beam from the aiming light to insure correct alignment of the photograph with respect to the aforesaid lens means.

Other objects of the invention will, in part, be obvious and will, in part, appear hereinafter.

BRIEF DESCRIPTION OF THE DRAWINGS

The novel features that are considered to be characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DETAILED DESCRIPTION

Figure 1:
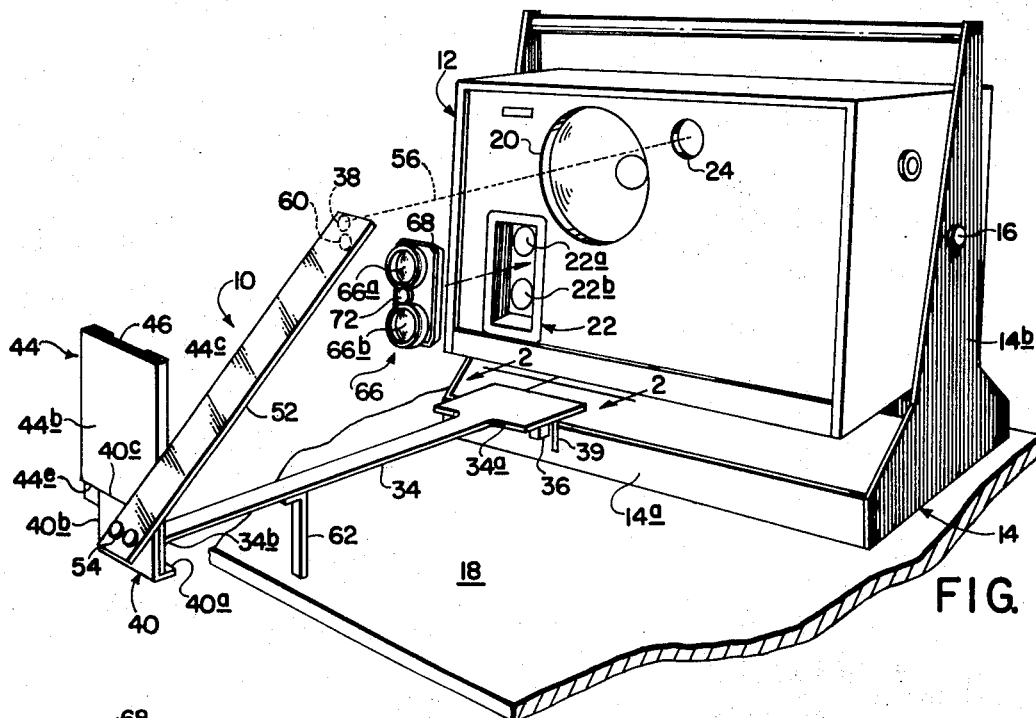
FIG. 1 is a diagrammatic perspective view of the device of the invention attached to the camera unit of an identification system.
Figure 3:
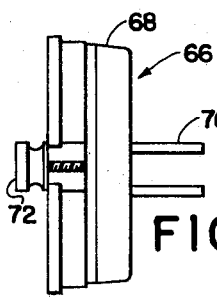
FIG. 3 is a diagrammatic side view of an element for mounting supplemental lens means.
Figure 4:
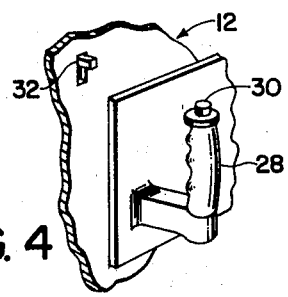
FIG. 4 is a diagrammatic fragmentary view of a pistol-grip handle, shutter release means and electrical switching means of the camera.
Figure 5:
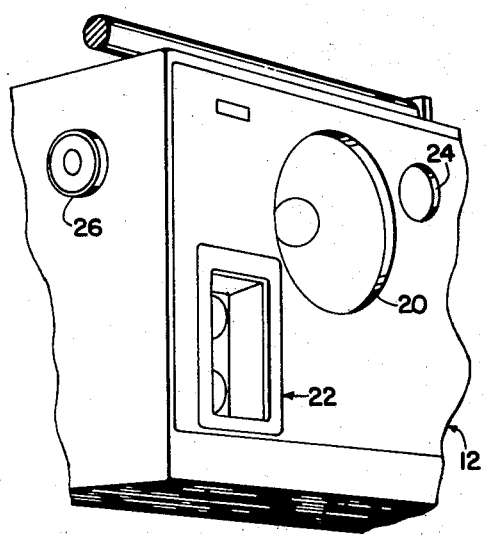
FIG. 5 is a diagrammatic fragmentary view of a component for controlling the intensity of light emanating from an electronic flash unit.
Figure 2:
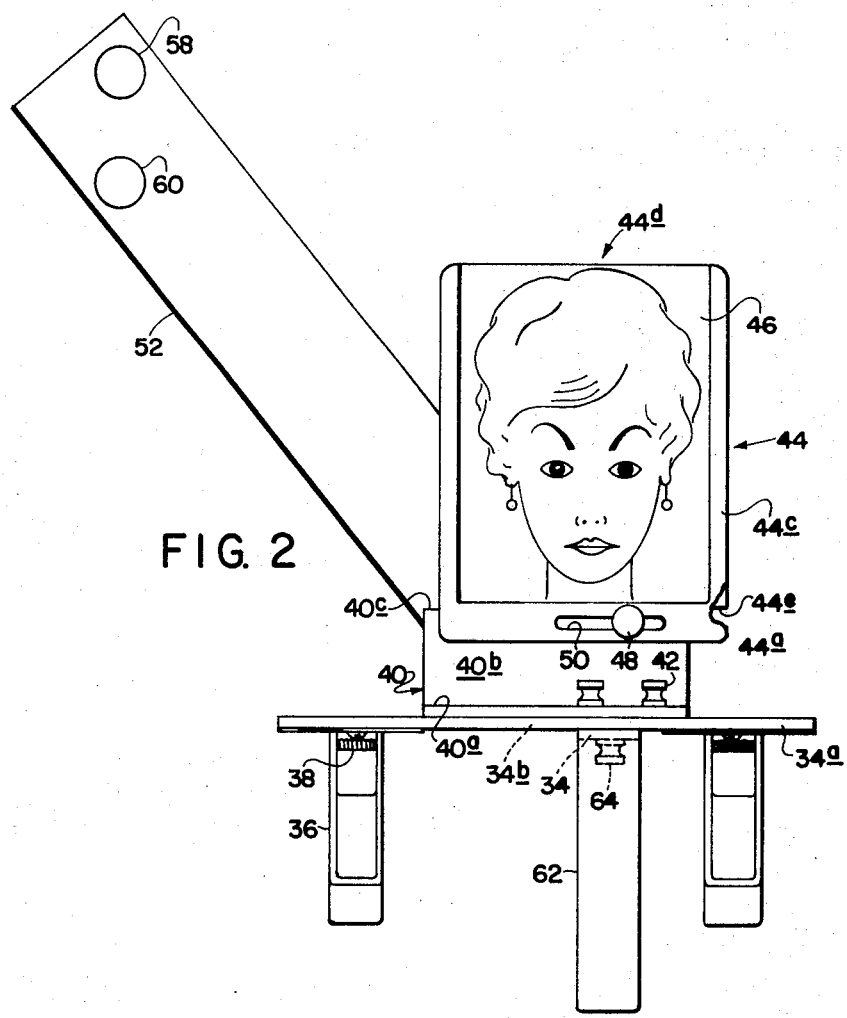
FIG. 2 is a diagrammatic front view of the print-positioning element of the invention taken in the direction 2—2 of FIG. 1.

The accessory device 10 of the invention is illustrated in FIG. 1 in operative relation to a camera component 12 of an identification system. Significant portions of the camera 12 with respect to the invention are the mounting base or cradle 14, including the front wall section 14a, the uprights 14b and the supporting shafts 16 upon which the camera is mounted for rotation or tilting relative to a surface such as a plane. Representative of such a plane is the supporting surface 18 of a mounting stand or the like. Other components of the camera especially relating to the invention include an electronic flash unit 20, a lens assembly 22, composed of vertically-spaced lenses 22a and 22b, an aiming light 24 producing a substantially collimated beam 56, an electronic control 26 (FIG. 5) for varying the intensity of light produced by the flash unit 20, and a pistol grip 28, shutter release button 30 and so-called "single-twin" switch (FIG. 4) located at the rear of the camera.

Referring now to the accessory device 10, an elongated rigid support member 34, composed, for example, of a metal such as aluminum or stainless steel, is releasably attached at its rear laterally-flaired extremity 34a to the front wall portion 14a of the camera cradle, as by the pair of clips 36, each biased by a torsion spring 38 to firmly engage the camera cradle portion 14a. A positioning mark 39 indicates the correct lateral location of member 34 relative to the camera. The support member 34 extending forwardly from the camera at 90° to the front face thereof, is releasably attached at its laterally-flaired front end 34b to the horizontal portion 40a of an angular bracket 40 by a pair of retaining screws 42. A frame element 44 comprises a base portion 44a, a flat rear supporting portion 44b, a pair of side portions or channels 44c and an open upper extremity 44d for slidable insertion or removal of a photographic print 46 between the channels 44c. The print 46, as previously intimated, is to be employed as the photographic subject in the exposure of film material carried by the camera 12.

The frame element 44 is attached to a vertical portion 40b of the bracket by a thumb-screw 48, freely passing through a horizontal slot 50 formed in frame portion 44a and threadedly engaging bracket portion 40b. A correct upright position of the frame element 44 and, accordingly, of print 46 mounted therein, is assured by the stepped horizontal structure of portion 44b of the frame element, as indicated at 44e, which is adapted to bear upon the upper horizontal edge 40c of the bracket. When thumb-screw 48 is manually loosened, the frame element may be moved laterally if a line adjustment is required, the stepped portion 44c of the frame slidably bearing upon the edge 40c of the bracket to maintain the vertical position of the print 46. When the desired lateral adjustment has been attained, thumb-screw 48 is tightened to engage the portions of frame portion 44a adjacent to slot 50 and hold the frame element 44 in firm engagement with the bracket 40.

An arm 52 is releasably fastened to the bracket 40 by a pair of retaining screws 54. The arm is so angularly disposed relative to the bracket that when the support member 34 is correctly attached to the cradle portion 14a of the camera, the aiming beam 56 is incident upon an extremity of the arm. Two small circular targets 58 and 60 are formed on the surface of arm 52 facing the camera. These targets are spaced apart, vertically, by a distance predetermined with respect to the distance of subject print 46 from the focal plane of the camera and by the upper and lower halves of a film positioned thereat as will be explained below.

To further insure the stability of the support member 34 and its attached components, above described, the depending leg 62 is releasably fastened thereto by retaining screw 64, its extremity bearing upon the supporting surface 18. Where retaining screws have been shown herein it is to be understood that they may have knurled heads adapted to their manual tightening or removal, whereby the structure may easily be disassembled. The bracket 40, frame 44, arm 52 and leg 62 may, appropriately, be formed of a metal such as those mentioned with respect to the support 34, or one or more of the components may be composed of a suitable plastic material such, for example, as that known as ASB.

In a conventional identification system employing the camera 12, a human subject is positioned at a distance of 64 inches from either camera lens 22. Each lens is an f/8 150 mm lens. The aiming light 24 projects a point of light onto the subject's face. Intensity of flash and shutter speed are preset. The camera optical system, through use of the "single-twin" switch 32 and the shutter release 30, permits either individual or simultaneous exposure of the upper and lower halves of the film. Each film half is exposed, in separate areas thereof, both to the human subject by the lenses 22a and 22b and, by an internal pair of lenses (not shown), to identification subject matter placed in the camera on a "data card."

The accessory device of the subject invention includes, in addition to the components above described, a supplementary lens assembly or element 66 comprising the mount 68, the spacer lugs 70, the handle 72 and the lenses 66a and 66b. Each lens has a power of approximately 15 diopters providing a given reduction of the subject-to-film plane distance. In the example shown, a correct distance of the subject print 46 from the camera lens is approximately 24 inches, as provided by the structure of the support member 34 and associated components. The mount 68 is adapted to be inserted in the recess of the camera lens assembly 22 and is frictionally held therewithin, the spacer lugs 70 insuring the correct optical spacing of the aligned lenses of the camera and supplemental unit. Ready insertion or removal of the mount 68 is facilitated by the handle 72.

It is to be noted that the aiming beam 56, being intercepted at a shortened distance from the aiming light 24 by the targets 58 or 60, as compared to the original distance to the subject of 64 inches, is now in the form of a bundle of light rays of a diameter which substantially fills the target. With the aiming beam 56 aligned with the upper target 58, as obtained through tilting of the camera, for example by means of the pistol grip 28, the upper aligned lenses 66a and 22a of the supplemental element and camera, respectively, are properly positioned with respect to the subject print 46 for exposure of the upper half of the film located at the focal plane. With the aiming beam aligned with the lower target, the lower half of the film is subject to exposure.

Figure 6:
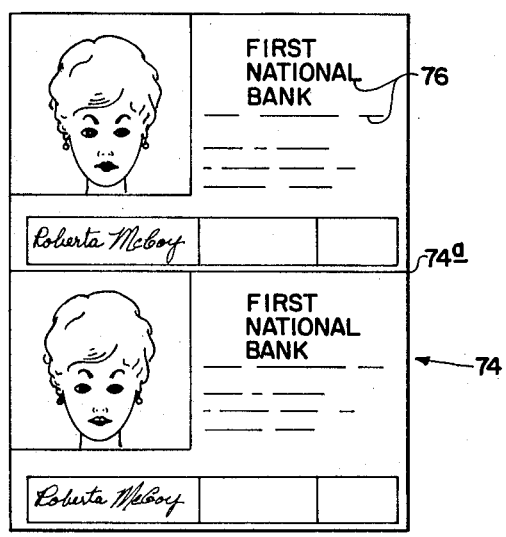
FIG. 6 illustrates identification cards of a type produced by the device of the invention in combination with the camera unit.

Use of the "single-twin" switch 32 is limited to the "single" position as applied to the present invention. Accordingly, depression of the shutter-release button 30 provides an exposure of merely a given upper or lower half of the film at the focal plane depending upon the initial position of the aiming beam. The aiming beam is then swung to the second target and the other half of the film is exposed by actuation of the shutter release button 30. Two joined identification cards 74 produced through sequential exposure of the film to the subject print 46 and data supplied in the camera, followed by processing of the film, are illustrated in FIG. 6. The two halves are separable at 74a. The data is represented at 76.

In general, a somewhat lower intensity of light from the flash unit 20 is desirable relative to illumination of the subject print 46 at the shorter distance than that required for an animate subject at a distance of 64 inches. A reduction of the conventional illumination is obtained by turning the control element 26 (FIG. 5) to a lower setting. Whereas but one subject print has been shown herein as the subject undergoing photographing to produce both halves of the final identification card, it is to be understood that a different subject print could be employed to produce the second half. A complete procedural sequence relating to production of an identification card is contained in the literature relating to the "ID-2 Land Identification System" which is readily procurable from Polaroid Corporation. Inasmuch as it involves elements not necessary to an understanding of the present invention and not shown, such as those relating to a "data card" and processing of the film, this complete procedure is not included herein.

It will be understood that the subject invention may be modified in certain aspects without departing from the spirit or character thereof. The preferred embodiment described herein is, therefore, to be regarded as illustrative and not restrictive, the scope thereof being indicated by the appended claims, and all variations which come within the meaning of the appended claims are intended to be embraced therein.

What is claimed is:

1. Apparatus for use with a camera including means for mounting a sheet of photographic material at a film plane, means for directing such camera towards a first subject positioned at a first predetermined distance in front of such camera to facilitate the recording of an image thereof on such sheet of photographic material, such directing means including an aiming beam, and lens means for forming an image of such first subject at such film plane, said apparatus comprising:

means for positioning a second subject at a second predetermined distance, substantially less than such first predetermined distance, in front of such camera;

means cooperating with such camera aiming beam for aligning such camera with such second subject to facilitate the recording of an image thereof on such sheet of photographic material, said aligning means including a target connected to said positioning means; and means for reducing the subject-to-film plane focusing characteristic of such camera lens means to form an image of such second subject at such film plane.

2. The invention of claim 1 wherein such second subject comprises a photographic print and said positioning means includes means for releasably mounting such photographic print.

3. The invention of claim 1 wherein such camera is movably connected to a support and said positioning means includes means for releasably connecting it to such support.

4. The invention of claim 1 wherein said subject-to-film plane focus characteristic reducing means comprises a supplemental lens adapted to be positioned in the optical path of such camera lens means.

5. Apparatus for use with a camera including means for mounting a sheet of photographic material at a film plane, means for directing such camera towards a first subject positioned at a first predetermined distance in front of such camera to facilitate the recording of a plurality of images thereof on respective mutually exclusive areas of such sheet of photographic material and lens means for forming a plurality of images of such first subject on such respective mutually exclusive areas of such sheet of photographic material at such film plane, said apparatus comprising:

means for positioning a second subject at a second predetermined distance, substantially less than such first predetermined distance, in front of such camera;

means cooperating with such camera directing means for aligning such camera with such second subject to facilitate the sequential recording of such plurality of images thereof on such respective mutually exclusive areas of such sheet of photographic material, said aligning means including a plurality of targets mountable for use with such aiming means; and means for reducing the subject-to-film plane focusing characteristic of such camera lens means to form an image of such second subject at such film plane.

6. The invention of claim 5 wherein said plurality of targets are fixedly spaced one from the other.

7. The invention of claim 5 wherein said plurality of targets are connected to said positioning means.

8. The invention of claim 5 wherein such second subject comprises a photographic print and said positioning means includes means for releasably mounting such photographic print.

9. The invention of claim 5 wherein such camera is movably connected to a support and said positioning means includes means for releasably connecting it to such support.

10. An accessory device for use with the camera unit of an identification system to enable employment of a photographic print bearing a likeness of an animate subject as the photographic subject instead of, as normally, the actual animate subject, thereby to provide a photographic copy of such print superimposed on an identification card, such camera including lens means, a flash unit, means providing an aiming beam, means for supplying data to be carried with such copy of such photographic print on such identification card, and means for exposing and processing a supply of photographic film material, said accessory device comprising:

supplemental lens means for accommodating such camera lens means to a modified subject-to-film plane distance which is less than the normal distance which would be employed for such actual animate subject;

means for mounting such photographic print in front of such camera unit at a predetermined position relative thereto; and means fixedly attached to said print mounting means having a plurality of target indicia carried thereon upon which such aiming beam is adapted to be selectively focused to control the position of such photographic print copy relative to such film material during its exposure and, thereby, relative to such identification card.

11. An accessory device, as defined in claim 10, wherein said supplemental lens means comprises a mounting member releasably attachable to a portion of such camera unit in front of such camera lens means, said mounting member including means for determining the spacing between said supplemental lens means and such camera lens means.

12. An accessory device, as defined in claim 11, wherein such camera lens means is a pair of vertically-spaced identical lens elements and said supplemental lens means is a pair of vertically-spaced identical lens elements cooperating with such pair of camera lens elements mounted in said mounting member and adapted to be optically aligned with such pair of camera lens elements when said mounting member is attached to such camera portion.

13. An accessory device, as defined in claim 12, wherein said target indicia is in the form of two index marks in predeteminately, vertically-spaced relation.

14. An accessory device, as defined in claim 13, wherein said target indicia is carried by an arm member attached to and projecting sideways at a given angle from said print mounting means.

15. An accessory device, as defined in claim 10, wherein said print mounting means includes a frame element for releasably positioning such photographic print therein.

16. An accessory device, as defined in claim 15, wherein said frame element is laterally adjustable.

17. An accessory device, as defined in claim 10, wherein such camera unit is mounted for pivotal movement about a horizontal axis identified with fixed cradle means and wherein said print mounting means comprises an elongated support member releasably attached at one end to, and extending forwardly from, such cradle means.

18. An accessory device, as defined in claim 17, wherein attachment of said elongated support to such cradle means is provided by spring-biased clip means.

19. An accessory device, as defined in claim 17, wherein a bracket is attached to an opposite end of said elongated support member, said target-indicia-carrying arm being fastened to said bracket.

20. An accessory device, as defined in claim 19, wherein such camera cradle means is adapted to be mounted on a horizontal surface and wherein a supporting leg is attached to said elongated support member and depends therefrom so as to contact such horizontal surface.

21. An accessory device, as defined in claim 19, wherein said print mounting means includes a frame element for releasably positioning such photographic print therein and said frame element is also attached to said bracket.

22. An accessory device, as defined in claim 21, wherein said frame element comprises a stepped edge adapted to slideable lateral movement along an edge of said bracket and a slot formed in a frame portion, and wherein said bracket includes a thumb-screw for engaging the edges of said slot to determine the lateral position of said frame element.

23. An accessory device, as defined in claim 14, wherein said print mounting means and such camera means providing an aiming beam are relatively vertically adjustable.

24. An accessory device, as defined in claim 17, wherein such aiming beam is rendered vertically adjustable by tilting such camera unit about such horizontal axis to align such beam selectively with said target indicia.

25. An accessory device, as defined in claim 20, wherein said elongated support member, bracket, frame, target carrying arm, and supporting leg are releasably connected to one another.

26. An accessory device, as defined in claim 15, wherein said print mounting frame element is composed of an enclosing flat back member, a pair of channelled side members and a supporting base member, such print being adapted to insertion through the opening formed between the upper extremities of said channeled members and downwardly between said channelled members to said base member, the latter constituting a limit stop.

27. An accessory device, as defined in claim 23, wherein, when such aiming beam is aligned with the upper of said two target index marks an image of such photographic print is formed on a first given partial area of film material positioned for exposure at an image plane of such camera unit and when such beam is aligned with the lower of said index marks such image is formed on a second given partial area of such film material, two images thus being formed on separate areas of the film material as provided by such pairs of camera lens and said supplemental lens elements in cooperating relation.

28. An accessory device, as defined in claim 21, wherein said elongated support member extends in a direction normal to the face of such camera unit and wherein the principal surfaces of said bracket, said frame element and said target-indicia-carrying arm are parallel to such face.

29. An accessory device, as defined in claim 10, wherein said target indicia are in the form of small circles adapted to have such aiming beam substantially aligned therewith, such camera lens means and said supplemental lens means then being correctly aligned relative to such photographic print mounted in said frame element.

* * * * *